(12) United States Patent
Muraoka et al.

(10) Patent No.: US 9,559,362 B2
(45) Date of Patent: Jan. 31, 2017

(54) NONAQUEOUS ELECTROLYTE SECONDARY BATTERY AND METHOD FOR MANUFACTURING THE SAME

(75) Inventors: Yoshiyuki Muraoka, Osaka (JP); Yukihiro Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 331 days.

(21) Appl. No.: 12/935,189

(22) PCT Filed: Mar. 31, 2009

(86) PCT No.: PCT/JP2009/001484
§ 371 (c)(1),
(2), (4) Date: Sep. 28, 2010

(87) PCT Pub. No.: WO2009/122717
PCT Pub. Date: Oct. 8, 2009

(65) Prior Publication Data
US 2011/0027635 A1 Feb. 3, 2011

(30) Foreign Application Priority Data

Apr. 1, 2008 (JP) ................................. 2008-095232

(51) Int. Cl.
*H01M 4/66* (2006.01)
*H01M 4/13* (2010.01)
(Continued)

(52) U.S. Cl.
CPC ........... *H01M 4/661* (2013.01); *H01M 4/0471* (2013.01); *H01M 4/13* (2013.01);
(Continued)

(58) Field of Classification Search
CPC .............................. H01M 4/661; H01M 4/662
See application file for complete search history.

(56) References Cited

U.S. PATENT DOCUMENTS

2004/0072079 A1* 4/2004 Hashimoto ........... H01M 4/133
429/245
2005/0186477 A1 8/2005 Ryu
(Continued)

FOREIGN PATENT DOCUMENTS

JP 05-182692 7/1993
JP 05-182693 7/1993
(Continued)

OTHER PUBLICATIONS

JP 2001076711 A, JPO Machine Translation.*
(Continued)

*Primary Examiner* — Maria J Laios
*Assistant Examiner* — Robert S Carrico
(74) *Attorney, Agent, or Firm* — McDermott Will & Emery LLP

(57) ABSTRACT

The nonaqueous electrolyte secondary battery of the invention includes: a wound-type electrode group including a long positive electrode, a long negative electrode, and a separator disposed between the positive electrode and the negative electrode; a nonaqueous electrolyte; and a prismatic battery case accommodating the electrode group and the nonaqueous electrolyte. A horizontal cross-section of the electrode group has a major axis and a minor axis. The positive electrode includes a positive electrode current collector and a positive electrode active material layer disposed thereon, and the negative electrode includes a negative electrode current collector and a negative electrode active material layer disposed thereon. A tensile strength of the positive electrode when an elongation percentage in a longitudinal direction of the positive electrode is 1% is not greater than 15 N/cm.

3 Claims, 1 Drawing Sheet

(51) Int. Cl.
  *H01M 4/04* (2006.01)
  *H01M 2/02* (2006.01)
  *H01M 10/0587* (2010.01)
  *H01M 10/052* (2010.01)
  *H01M 4/02* (2006.01)

(52) U.S. Cl.
  CPC ...... *H01M 10/0587* (2013.01); *H01M 10/052* (2013.01); *H01M 2004/021* (2013.01); *Y02E 60/122* (2013.01); *Y02P 70/54* (2015.11); *Y02T 10/7011* (2013.01); *Y10T 29/49115* (2015.01)

(56) References Cited

U.S. PATENT DOCUMENTS

| | | |
|---|---|---|
| 2009/0123840 A1 | 5/2009 | Shirane et al. |
| 2010/0068627 A1 | 3/2010 | Muraoka et al. |

FOREIGN PATENT DOCUMENTS

| | | | |
|---|---|---|---|
| JP | 07-105970 | | 4/1995 |
| JP | 09-213339 | | 8/1997 |
| JP | H09-213339 A | | 8/1997 |
| JP | 2001076711 A | * | 3/2001 |
| JP | 2001-135305 | | 5/2001 |
| JP | 2005-259682 A | | 9/2005 |
| JP | 2006190691 A | * | 7/2006 |
| JP | 2007-128660 | | 5/2007 |
| JP | 2008-186704 | | 8/2008 |
| KR | 2005-0086218 A | | 8/2005 |
| KR | 2007-0095876 A | | 10/2007 |
| WO | WO 2007074654 A1 | * | 7/2007 |
| WO | WO 2009/019861 A1 | | 2/2009 |

OTHER PUBLICATIONS

JP 2006190691 A Machine Translation.*
IDPL Machine Translation of JP 09213339 A.*
Korean Office Action issued in Korean Patent Application No. 10-2010-7022579 mailed Sep. 13, 2012.
Japanese Office Action issued in corresponding Japanese Application, dated Jul. 4, 2013.

* cited by examiner

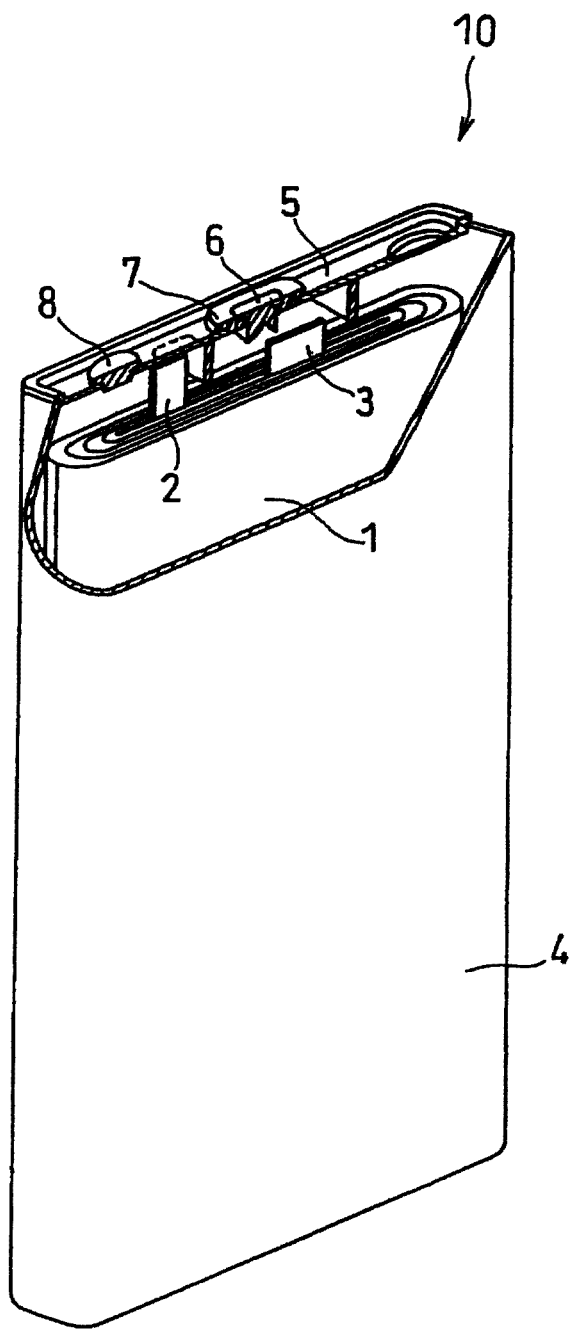

NONAQUEOUS ELECTROLYTE SECONDARY BATTERY AND METHOD FOR MANUFACTURING THE SAME

RELATED APPLICATIONS

This application is the U.S. National Phase under 35 U.S.C. §371 of International Application No. PCT/JP2009/001484, filed on Mar. 31, 2009, which in turn claims the benefit of Japanese Application No. 2008-095232, filed on Apr. 1, 2008, the disclosures of which Applications are incorporated by reference herein.

TECHNICAL FIELD

The present invention relates to a nonaqueous electrolyte secondary battery and a method for manufacturing the same, and, in particular, relates to an improvement of an electrode group included in a nonaqueous electrolyte secondary battery.

BACKGROUND ART

Recently, in view of environmental problems, there is a demand for a small and light secondary battery that is capable of quick charge and large current discharge, in response to a request for a power source that is to be mounted on an automobile or a request for a large tool with DC (with a direct-current power source). As a battery satisfying this demand, there is a nonaqueous electrolyte secondary battery such as a lithium secondary battery in which a negative electrode active material contains metallic lithium, a lithium alloy, or a material capable of intercalating and deintercalating lithium ions (e.g., carbon material) (see Patent Document 1, for example). Such a nonaqueous electrolyte secondary battery contains a nonaqueous electrolyte, and the nonaqueous electrolyte contains, for example, an aprotic organic solvent and a lithium salt dissolved in the organic solvent.

The nonaqueous electrolyte secondary battery can be produced, for example, in the following manner.

A laminate including a sheet-like positive electrode, a sheet-like negative electrode including the negative electrode active material, and a separator disposed between the positive electrode and the negative electrode is wound to form an electrode group. The positive electrode and the negative electrode can include, for example, a current collector and an active material layer disposed thereon. The separator has functions of holding a nonaqueous electrolyte, and preventing a short circuit between the positive electrode and the negative electrode.

Next, the electrode group is accommodated in a battery case made of stainless steel, nickel-plated iron, or aluminum, and a nonaqueous electrolyte is injected into the battery case. Lastly, the opening of the battery case is sealed with a sealing plate, and, thus, a nonaqueous electrolyte secondary battery can be obtained.

Patent Document 1: Japanese Laid-Open Patent Publication No. Hei 5-182693

DISCLOSURE OF THE INVENTION

Problem to be Solved by the Invention

Here, when the nonaqueous electrolyte secondary battery has a wound-type electrode group, if charge/discharge cycles of the battery are repeated, buckling of the electrode group may occur. More specifically, when the negative electrode active material contains a material that significantly changes in the volume during charge/discharge, the negative electrode active material swells during charge, and, thus, elongation stress is applied to the negative electrode. When the positive electrode cannot follow elongation of the negative electrode caused by swelling of the negative electrode active material, only the negative electrode is elongated in the electrode group, and position gap occurs between the positive electrode and the negative electrode. As a result, recesses and projections are formed on the electrode group, that is, wrinkling occurs in the electrode group (in particular, on the negative electrode), and buckling of the electrode group occurs. When buckling of the electrode group occurs, the distance between the positive electrode and the negative electrode becomes non-uniform. A portion where the positive electrode and the negative electrode are away from each other has a high overvoltage during charge, and cannot be easily charged. A portion where the positive electrode and the negative electrode are close to each other has a low overvoltage, and can be easily charged. That is to say, in the electrode group, a portion that cannot be easily charged and a portion that can be easily charged are formed (that is to say, non-uniform charge/discharge occurs). As a result, each time charge/discharge cycles are repeated, the battery capacity is reduced.

Furthermore, if non-uniform charge/discharge occurs, as described above, in the electrode group, a portion where the charged quantity of electricity is large (i.e., a portion that can be easily charged) is locally formed, and metallic lithium is locally precipitated on the surface of the negative electrode at that portion. In this case, when the battery temperature increases, precipitated metallic lithium and the nonaqueous electrolyte may react with each other. That is to say, the thermal stability of the battery after charge/discharge cycles may be lowered.

However, conventionally, sufficient measures are not taken for this sort of problem.

It is an object of the present invention to provide a nonaqueous electrolyte secondary battery having good charge/discharge cycle characteristics, and good thermal stability and good dimensional stability after repeated charge/discharge cycles.

Means for Solving the Problem

A nonaqueous electrolyte secondary battery according to the present invention includes: a wound-type electrode group including a long positive electrode, a long negative electrode, and a separator disposed between the positive electrode and the negative electrode; a nonaqueous electrolyte; and a prismatic battery case accommodating the electrode group and the nonaqueous electrolyte; wherein a horizontal cross-section of the electrode group has a major axis and a minor axis. The positive electrode includes a positive electrode current collector and a positive electrode active material layer disposed on the positive electrode current collector, and the negative electrode includes a negative electrode current collector and a negative electrode active material layer disposed on the negative electrode current collector. A tensile strength of the positive electrode when an elongation percentage in a longitudinal direction of the positive electrode is 1% is not greater than 15 N/cm. The tensile strength of the positive electrode can be controlled by heat-treating the positive electrode.

Here, the horizontal cross-section of the electrode group refers to a face perpendicular to the winding axis of the electrode group.

It is preferable that the negative electrode active material included in the negative electrode active material layer includes a silicon-containing material.

Furthermore, the present invention is directed to a method for manufacturing a nonaqueous electrolyte secondary battery, including the steps of: (i) forming a long positive electrode including a positive electrode current collector and a positive electrode active material layer disposed on the positive electrode current collector; (ii) forming a long negative electrode including a negative electrode current collector and a negative electrode active material layer disposed on the negative electrode current collector; (iii) heat-treating the positive electrode at a predetermined temperature to set a tensile strength of the positive electrode when an elongation percentage in a longitudinal direction of the positive electrode is 1% to not greater than 15 N/cm; and (iv) forming a wound-type electrode group whose horizontal cross-section has a major axis and a minor axis using the heat-treated positive electrode and the negative electrode.

It is preferable that the positive electrode current collector is mainly composed of aluminum, that the positive electrode current collector contains iron atoms, and that the iron atoms are contained in an amount of 1.2 wt % to 1.7 wt % of the positive electrode current collector.

In a preferred embodiment of the present invention, in the step (iii), the positive electrode is heat-treated at 250 to 350° C. for 1 to 120 seconds.

In another preferred embodiment of the present invention, in the step (iii), the positive electrode is heat-treated at 220 to 250° C. for 2 to 60 minutes.

In another preferred embodiment of the present invention, in the step (iii), the positive electrode is heat-treated at 160 to 220° C. for 60 to 600 minutes.

Effect of the Invention

According to the present invention, even when charge/discharge cycles are repeated, in particular, occurrence of buckling of a wound-type electrode group accommodated in a prismatic battery can be suppressed. Thus, the present invention can provide a nonaqueous electrolyte secondary battery in which deformation of the battery after repeated charge/discharge is suppressed, and that has excellent cycle characteristics and excellent thermal stability.

BRIEF DESCRIPTION OF THE DRAWING

FIG. 1 is a partially cut-out perspective view of a nonaqueous electrolyte secondary battery according to an embodiment of the present invention.

BEST MODE FOR CARRYING OUT THE INVENTION

A nonaqueous electrolyte secondary battery of the present invention includes: a wound-type electrode group including a positive electrode, a negative electrode, and a separator disposed between the positive electrode and the negative electrode; a nonaqueous electrolyte; and a prismatic battery case accommodating these constituent components. The positive electrode includes a positive electrode current collector, and a positive electrode active material layer disposed on the positive electrode current collector. The negative electrode includes a negative electrode current collector, and a negative electrode active material layer disposed on the negative electrode current collector. A horizontal cross-section of the electrode group used in the nonaqueous electrolyte secondary battery of the present invention has a major axis and a minor axis. That is to say, the shape of a face perpendicular to the winding axis of the electrode group (horizontal cross-section) need only be elliptical or substantially elliptical. Here, a substantially elliptical shape refers to a shape that is not elliptical but is similar to an elliptical shape or close to an elliptical shape.

In a wound-type electrode group, when position gap occurs between the positive electrode and the negative electrode, wrinkling occurs in the electrode group. That is to say, buckling of the electrode group occurs. In particular, in the case of a prismatic battery, the horizontal cross-section of the electrode group needs to be elliptical or substantially elliptical, and in such an electrode group, the curvature of a curved portion in the major axis direction in the horizontal cross-section of the electrode group is larger than that of the other portions. In such a situation, if the positive electrode cannot follow elongation of the negative electrode, the winding shift at the curved portion increases. That is to say, the position gap between the positive electrode and the negative electrode increases.

Thus, in the present invention, the tensile strength when the elongation percentage in the longitudinal direction of the positive electrode is 1% is set to not greater than 15 N/cm. This can significantly suppress occurrence of the position gap between the positive electrode and the negative electrode. Accordingly, the buckling of the electrode group caused by wrinkling of the electrode group can be suppressed. Thus, occurrence of non-uniform charge/discharge is suppressed, and a rapid reduction of the battery capacity occurring each time charge/discharge cycles are repeated can be suppressed.

Furthermore, since occurrence of non-uniform charge/discharge is suppressed, local formation of a portion where the charged quantity of electricity is large can also be suppressed. Accordingly, precipitation of metallic lithium on the surface of the negative electrode is suppressed, and, thus, the thermal stability of the battery after repeated charge/discharge cycles can also be improved.

Furthermore, according to the present invention, buckling of the electrode group, that is, deformation of the electrode group can be suppressed, and, thus, deformation of the battery can also be suppressed.

The tensile strength of the positive electrode depends on the strength of the positive electrode current collector. The tensile strength of the positive electrode can be controlled, for example, by adjusting the thickness or the composition of the positive electrode current collector. Alternatively, the tensile strength of the positive electrode can also be controlled by heat-treating the positive electrode. Alternatively, the tensile strength of the electrode may be controlled by heat-treating the positive electrode and adjusting the thickness of the positive electrode current collector.

When the tensile strength of the positive electrode is controlled by adjusting the thickness of the current collector or heat-treating the positive electrode as described above, the thickness of the positive electrode current collector is preferably 1 to 500 μm, more preferably 5 to 30 μm. Furthermore, if the thickness of the positive electrode current collector is set to the above-described range, it is possible to reduce the weight of the positive electrode while maintaining the strength of the positive electrode.

Here, the lower limit value of the tensile strength of the positive electrode is determined as appropriate according to production conditions and the like when the positive electrode is mass-produced.

The tensile strength of the positive electrode is measured by the following method.

After a battery is charged to a predetermined voltage, the battery is disassembled, and a positive electrode is taken out. This positive electrode is used to form a test strip having a width of 15 mm and a length of 20 mm. One end in the longitudinal direction of the test strip is fixed, and the other end is pulled in the longitudinal direction while the tensile force is changed such that the positive electrode is elongated at a speed of 1 mm/min. The tensile strength when the elongation percentage of the test strip has reached 1% is taken as the tensile strength of the positive electrode. Here, the tensile strength refers to a tensile force per unit length of the width in a direction perpendicular to the direction in which the test strip is pulled.

The elongation percentage of the test strip can be obtained using the formula: $\{(\beta-\alpha)/\alpha\}\times100$, when the length of the test strip before the pulling operation is taken as $\alpha$, and the length of the test strip after the pulling operation is taken as $\beta$.

Here, when the battery is disassembled, the positive electrode active material may be detached, and only the positive electrode current collector may remain or the active material layer may be slightly attached thereto. However, since the strength of the positive electrode depends on the positive electrode current collector, the tensile strength of the positive electrode current collector or the tensile strength of a positive electrode including the positive electrode current collector and the positive electrode active material layer slightly disposed thereon need only be within the above-described range.

Hereinafter, the positive electrode and the negative electrode included in the nonaqueous electrolyte secondary battery of the present invention will be specifically described.

The positive electrode includes a positive electrode current collector and a positive electrode active material layer disposed thereon. The positive electrode active material layer contains a positive electrode active material as an essential component, and may contain a conductive agent, a binder, and the like as an optional component. In a similar manner, the negative electrode includes a negative electrode current collector and a negative electrode active material layer disposed thereon. The negative electrode active material layer contains a negative electrode active material as an essential component, and may contain a conductive agent, a binder, and the like as an optional component.

As the positive electrode active material, materials known in the art can be used. Examples of such a material include lithium composite oxides such as lithium cobaltate, lithium nickelate, and lithium manganate. Furthermore, materials whose elements are partially substituted with different elements can also be used. The average particle size of the positive electrode active material is preferably 5 μm or more and 20 μm or less.

As the binder for the positive electrode, for example, polyvinylidene fluoride, polytetrafluoroethylene, polyethylene, polypropylene, an aramid resin, polyamide, polyimide, polyamide imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, polyhexafluoropropylene, styrene-butadiene rubber, or carboxymethyl cellulose can be used. Furthermore, a copolymer containing two or more monomer units selected from the group consisting of tetrafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene can be used as the binder. These materials can be used alone or in a combination of two or more.

Among these materials, polyvinylidene fluoride (PVDF) is preferably used as the binder. Polyvinylidene fluoride is chemically stable even in an environment inside a nonaqueous electrolyte secondary battery typified by a lithium ion battery, and is also inexpensive. Furthermore, polyvinylidene fluoride is excellent in particular in binding properties between an active material layer and a current collector and binding properties between active material particles. Accordingly, when polyvinylidene fluoride is used as the binder, good cycle characteristics, good discharging characteristics, and the like can be obtained.

As the conductive agent for the positive electrode, for example, conductive materials known in the art can be used. Examples of such a material include graphites such as natural graphite and artificial graphite, carbon blacks such as acetylene black, ketjen black, channel black, furnace black, lamp black, and thermal black, conductive fibers such as a carbon fiber and a metallic fiber, metal powders such as an aluminum powder, conductive whiskers such as zinc oxide and potassium titanate, conductive metal oxides such as titanium oxide, organic conductive materials such as a phenylene derivative, and fluorinated carbon.

As the negative electrode active material, materials known in the art can be used. Examples of such a material include metals, metallic fibers, carbon materials, oxides, nitrides, tin-containing materials, silicon-containing materials, and various alloy materials. Examples of the carbon materials include various natural graphites, cokes, carbon in the process of graphitization, carbon fibers, spherical carbons, various artificial graphites, and amorphous carbons. These materials can be used alone or in a combination of two or more.

When, among the above-described materials, a material that has a high capacity density but significantly changes in the volume during charge/discharge is used as the negative electrode active material, the present invention is particularly effective. Examples of such a material include tin-containing materials and silicon-containing materials.

When a negative electrode active material that significantly changes in the volume during charge/discharge is used, the winding shift may significantly increase in a curved portion in the major axis direction of the electrode group contained in the prismatic battery. However, if the tensile strength of the positive electrode when the elongation percentage of the positive electrode is 1% is set to not greater than 15 N/cm, the winding shift between the positive electrode and the negative electrode can be sufficiently suppressed. Thus, even when a negative electrode active material that has a high capacity but significantly changes in the volume during charge/discharge is used, the buckling of the electrode group can be sufficiently suppressed.

Examples of the silicon-containing material include a simple substance of silicon and a silicon oxide $SiO_x$ ($0.05<x<1.95$). Furthermore, a silicon alloy, a silicon compound, a silicon solid solution, and the like in which Si is partially substituted with at least one element selected from the group consisting of B, Mg, Ni, Ti, Mo, Co, Ca, Cr, Cu, Fe, Mn, Nb, Ta, V, W, Zn, C, N, and Sn can also be used.

Here, the silicon compound refers to a silicon-containing material excluding a simple substance of silicon, a silicon oxide, a silicon alloy, and a silicon solid solution.

Examples of the tin-containing material include a simple substance of tin, $Ni Sn_4$, $Mg_2Sn$, $SnO_x$ $(0<x<2)$, $SnO_2$, and $SnSiO_3$.

There is no particular limitation on the conductive agent for the negative electrode. As the conductive agent for the negative electrode, for example, the materials given as an example of the conductive agent for the positive electrode can be used. Furthermore, there is no particular limitation on the binder for the negative electrode. As the binder for the negative electrode, for example, the materials given as an example of the binder for the positive electrode can be used.

Furthermore, for example, when the active material layer contains an active material and a binder, and the active material layer is heat-treated at a temperature not lower than the melting point of the binder, the amount of binder is preferably reduced within the range in which the active material layer does not become detached from the current collector. When the binder is melted, the surface of the active material is covered by the binder. When the surface of the active material is covered by the binder, it becomes difficult to absorb or desorb lithium. As a result, the capacity is reduced. For example, the weight ratio between the active material and the binder varies depending on the specific surface area of the active material, the type of the binder, and the like, but, when a positive electrode active material used in an ordinary lithium ion battery is used, and PVDF is used as the binder, the amount of binder is preferably 0.5 parts by weight or more and 2.0 parts by weight or less per 100 parts by weight of the positive electrode active material.

As the positive electrode current collector and the negative electrode current collector, for example, a long conductive sheet can be used. The conductive sheet may also be porous.

As the positive electrode current collector, a metal sheet mainly composed of aluminum or the like can be used. In particular, it is preferable that the positive electrode current collector is mainly composed of aluminum and contains iron atoms. The iron atoms are preferably contained in an amount of 1.2 wt % to 1.7 wt % of the positive electrode current collector. In the nonaqueous electrolyte secondary battery, an aluminum foil (e.g., 1085, 1N30, 3003-series, or the like) commonly used as the positive electrode current collector has an amount of iron atoms of less than 1.2 wt % of the positive electrode current collector. Accordingly, when the heat treatment is performed at a low temperature, or the heat treatment time is shortened, the elongation percentage of the current collector is difficult to control.

On the other hand, when iron atoms are contained in an amount of 1.2 wt % to 1.7 wt % of the positive electrode current collector made of aluminum, the elongation percentage of the electrode can be controlled only by performing heat treatment at a lower temperature for a shorter time than when a conventional current collector made of aluminum is used. Accordingly, a state in which components such as a binder containing PVDF or the like contained in the active material layer of the electrode are melted is suppressed. Thus, a state in which the surface of the active material is covered by the melted binder is suppressed, and, thus, a reduction in the capacity can be suppressed to the extent possible. That is to say, deterioration of the battery characteristics can be suppressed. Furthermore, using this positive electrode current collector makes it possible to produce a positive electrode capable of providing the effect of the present invention with a simple manufacturing method.

Examples of materials used for the negative electrode current collector include stainless steel, nickel, and copper. Among these materials, copper is preferably used in view of material cost and chemical stability in a battery.

As in the case of the positive electrode current collector, the thickness of the negative electrode current collector is preferably 1 to 500 µm, more preferably 5 to 30 µm. Accordingly, it is possible to reduce the weight of the negative electrode while maintaining the strength of the negative electrode.

Here, the tensile strength when the elongation percentage in the longitudinal direction of the negative electrode is 1% is in the range of 7 to 15 N/cm although it depends on the type of the negative electrode current collector and the type of the negative electrode active material. Here, the tensile strength of the positive electrode may be adjusted to the range of 7 to 15 N/cm as in the case of the tensile strength of the negative electrode.

Next, a manufacturing method of the nonaqueous electrolyte secondary battery including a step of controlling the tensile strength of the positive electrode by heat-treating the positive electrode will be described.

The manufacturing method can include, for example, the steps of: (i) forming a long positive electrode including a positive electrode current collector and a positive electrode active material layer disposed on the positive electrode current collector; (ii) forming a long negative electrode including a negative electrode current collector and a negative electrode active material layer disposed on the negative electrode current collector; (iii) heat-treating the positive electrode at a predetermined temperature to set a tensile strength of the positive electrode when an elongation percentage in a longitudinal direction of the positive electrode is 1% to not greater than 15 N/cm; and (iv) forming a wound-type electrode group whose horizontal cross-section has a major axis and a minor axis using the negative electrode and the heat-treated positive electrode.

Steps (i) and (ii)

The positive electrode including the positive electrode current collector and the positive electrode active material layer disposed on the positive electrode current collector can be formed, for example, in the following manner. A positive electrode active material and a dispersion medium, and, if necessary, a conductive agent and a binder are mixed to prepare a mixture slurry. The obtained mixture slurry is applied to the surface of the positive electrode current collector, dried, and rolled to form a positive electrode active material layer. In this manner, the positive electrode can be obtained. The negative electrode can be formed in a similar manner to that of the positive electrode.

As the dispersion medium, an organic solvent such as N-methyl-2-pyrrolidone, water, and the like can be used. The type of the dispersion medium used is selected as appropriate, for example, depending on the type of the binder used.

Step (iii)

The positive electrode obtained as described above is heat-treated at a predetermined temperature, and the tensile strength of the positive electrode when the elongation percentage in the longitudinal direction of the positive electrode is 1% is set to not greater than 15 N/cm.

When the tensile strength of the positive electrode is adjusted by heat-treating the positive electrode, as described above, it is preferable that the positive electrode current collector is mainly composed of aluminum and contains iron atoms, and that the iron atoms are contained in an amount of 1.2 to 1.7 wt % of the positive electrode current collector. The conditions for heat-treating the positive electrode including such an iron-containing aluminum current collector are, for example, as follows.

(1) The positive electrode may be heated at 250 to 350° C. for 1 to 120 seconds.

(2) The positive electrode may be heated at 220 to 250° C. for 2 to 60 minutes.

(3) The positive electrode may be heated at 160 to 200° C. for 60 to 600 minutes.

When the positive electrode active material layer contains polyvinylidene fluoride (PVDF), a rubber-based binder, or the like as the binder, as described above, the battery capacity may be reduced. The battery capacity reduction tends to be larger as the heat treatment temperature is higher and the heat treatment time is longer.

That is to say, if the heat treatment time of the positive electrode is too long, the binder contained in the positive electrode may be melted, and the melted binder and the like may cover the surface of the active material, and, thus, the capacity of the positive electrode may be reduced. On the other hand, if the heat treatment time is too short, the tensile strength of the positive electrode may not be sufficiently controlled, and the effect of the present invention may not be sufficiently obtained.

If the heat treatment temperature of the positive electrode is too high, the binder contained in the positive electrode may be melted, and the melted binder may cover the surface of the active material, and, thus, the capacity of the positive electrode may be reduced. On the other hand, if the heat treatment temperature is too low, the tensile strength of the positive electrode may not be sufficiently controlled, and the effect of the present invention may not be sufficiently obtained.

That is to say, when the positive electrode is heat-treated with the above-described conditions, it is possible to control the tensile strength of the positive electrode without reducing the capacity.

In the present invention, the tensile strength of the positive electrode may be adjusted by further adjusting the thickness of the iron-containing aluminum current collector.

Here, the tensile strength of the positive electrode current collector when the elongation percentage in the longitudinal direction of the positive electrode current collector is 1% may be set to not greater than 15 N/cm, by heat-treating the positive electrode current collector before forming the positive electrode active material layer. Here, when the positive electrode current collector is made of aluminum foil, if the tensile strength of the positive electrode current collector is set to not greater than 15 N/cm, and then a mixture slurry is applied to the softened positive electrode current collector, dried, and rolled at a high pressure, the positive electrode current collector may be hardened. Meanwhile, if the density of the positive electrode active material layer is small, that is, the degree of rolling is low, hardening of the positive electrode current collector can be suppressed. Thus, when the positive electrode current collector is made of aluminum foil and the positive electrode active material layer is formed after the tensile strength of the positive electrode current collector has been set to not greater than 15 N/cm, the density of the positive electrode active material layer is preferably small.

The negative electrode may be or may not be heat-treated. Here, when the negative electrode in which the negative electrode active material layer contains a binder containing PVDF or the like is heat-treated, a current collector made of copper, such as a rolled copper foil or an electrolytic copper foil, is preferably used. The elongation percentage of the current collector made of this sort of copper is increased by heat treatment at approximately 200° C., and, thus, the tensile strength of the negative electrode can be controlled. Here, the elongation percentage of a rolled copper foil is greater than that of an electrolytic copper foil.

The electrode can be heat-treated, for example, using a hot air, an IH heater, far infrared radiation, a hot roll, or the like. Furthermore, the electrode may be heat-treated by passing electric current through the current collector, and generating heat in the electrode.

Step (iv)

The obtained positive electrode and negative electrode are used to form a wound-type electrode group whose horizontal cross-section has a major axis and a minor axis. More specifically, the positive electrode, a separator, the negative electrode are laminated such that the separator is disposed between the positive electrode and the negative electrode, and, thus, a long laminate is obtained. Next, the obtained laminate is wound to form an electrode group. The winding axis at that time is perpendicular to the longitudinal direction of the laminate.

The electrode group obtained in the step (iv) can be used, for example, to form a nonaqueous electrolyte secondary battery as shown in FIG. 1. FIG. 1 is a partially cut-out perspective view of a prismatic nonaqueous electrolyte secondary battery according to an embodiment of the present invention.

A prismatic battery 10 of FIG. 1 includes a wound-type electrode group 1 and a bottomed prismatic tubular battery case 4 accommodating the electrode group 1. As described above, the electrode group 1 includes a positive electrode, a negative electrode, and a separator disposed therebetween.

One end of a negative electrode lead 3 is connected to the negative electrode. The other end of the negative electrode lead 3 is connected via an upper insulating plate (not shown) to a rivet 6 located at the center of a sealing plate 5. The rivet 6 is insulated from the sealing plate 5 by an insulating gasket 7. One end of a positive electrode lead 2 is connected to the positive electrode. The other end of the positive electrode lead 2 is connected via the upper insulating plate to the back face of the sealing plate 5. The lower end of the electrode group 1 and the battery case 4 are insulated by a lower insulating plate (not shown). The upper insulating plate provides insulation between the negative electrode lead 3 and the battery case 4 and between the electrode group 1 and the sealing plate 5.

The peripheral edge of the sealing plate 5 is fitted to the open end portion of the battery case 4, and the fitted portion is sealed by laser welding. An injection opening for a nonaqueous electrolyte provided in the sealing plate 5 is blocked by a sealing stopper 8, and sealed by laser welding.

As the separator, a microporous membrane, a woven fabric, a non-woven fabric, or the like made of an insulating material and having a good ion permeability and a good mechanical strength is used. As the material forming the separator, materials known in the art can be used. Among these materials, polyolefin such as polyethylene or polypropylene is preferable as the material. A separator made of polyolefin has an excellent durability, and has a shut-down function. By using such a separator, the safety of the nonaqueous electrolyte secondary battery can be further improved.

Ordinarily, the thickness of the separator need only be 5 µm or more and 300 µm or less. The thickness of the separator is preferably 5 µm or more and 40 µm or less.

The porosity of the separator is preferably 30% or more and 70% or less, further preferably 35% or more and 60% or less. The porosity refers to a ratio of the volume of voids with respect to the volume of the separator.

When a microporous membrane is used as the separator, the microporous membrane may be a single layer membrane containing only one material or may be a composite membrane or multi-layer membrane containing one material or two or more materials.

As the nonaqueous electrolyte, either a liquid nonaqueous electrolyte or a gel nonaqueous electrolyte may be used.

The liquid nonaqueous electrolyte contains a nonaqueous solvent and a solute dissolved therein (e.g., a lithium salt).

As the nonaqueous solvent, for example, known nonaqueous solvents can be used, although not limited thereto. As the nonaqueous solvent, for example, cyclic carbonic acid esters, chain carbonic acid esters, cyclic carboxylic acid esters, and the like are used. Examples of the cyclic carbonic acid esters include propylene carbonate and ethylene carbonate. Examples of the chain carbonic acid esters include diethyl carbonate, ethyl methyl carbonate, and dimethyl carbonate. Examples of the cyclic carboxylic acid esters include γ-butyrolactone and γ-valerolactone. These nonaqueous solvents can be used alone or in a combination of two or more.

As the solute, for example, $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylates, LiCl, LiBr, LiI, chloroborane lithium, borates, and imide salts can be used, although not limited thereto.

Examples of borates include lithium bis(1,2-benzenediolato(2-)-O,O')borate, lithium bis(2,3-naphthalenediolato(2-)-O,O')borate, lithium bis(2,2'-biphenyldiolato(2-)-O,O')borate, and lithium bis(5-fluoro-2-olato-1-benzenesulfonato-O,O')borate.

Examples of imide salts include lithium bis(trifluoromethanesulfonyl)imide (($CF_3SO_2)_2NLi$), lithium trifluoromethanesulfonyl nonafluorobutanesulfonyl imide (NLi ($CF_3SO_2$) ($C_4F_9SO_2$)) and lithium bis (pentafluoroethanesulfonyl) imide (($C_2F_5SO_2)_2NLi$).

These solutes can be used alone or in a combination of two or more.

The liquid nonaqueous electrolyte may contain not only the nonaqueous solvent and the solute but also a material (additive) that can decompose on the negative electrode to form a membrane having a high lithium ion conductivity. Accordingly, the charge/discharge efficiency of the battery can be improved. Examples of such an additive include vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate, and divinyl ethylene carbonate. In these compounds, hydrogen atoms may be partially substituted with fluorine atoms.

These additives can be used alone or in a combination of two or more.

Furthermore, the amount of additive added with respect to the nonaqueous solvent is desirably 0.5 mol/L or more and 2 mol/L or less.

Among these materials, the additive preferably includes at least one selected from the group consisting of vinylene carbonate, vinyl ethylene carbonate, and divinyl ethylene carbonate.

Furthermore, the liquid nonaqueous electrolyte may contain a benzene derivative that decomposes during overcharge to form a membrane on the electrode and deactivates the battery. As the benzene derivative, a compound including a phenyl group and a cyclic compound group adjacent to the phenyl group is preferable. As the cyclic compound group, a phenyl group, a cyclic ether group, a cyclic ester group, a cycloalkyl group, a phenoxy group, and the like are preferable. Specific examples of the benzene derivative include cyclohexylbenzene, biphenyl, and diphenyl ether. These benzene derivatives can be used alone or in a combination of two or more. Here, the amount of benzene derivative with respect to the total amount of nonaqueous solvent and benzene derivative is preferably 10 vol % or less.

The gel nonaqueous electrolyte contains, for example, the liquid nonaqueous electrolyte and a polymer material for holding the liquid nonaqueous electrolyte. Examples of the polymer material include polyvinylidene fluoride, polyacrylonitrile, polyethylene oxide, polyvinyl chloride, polyacrylate, and a copolymer of vinylidene fluoride and hexafluoropropylene.

Hereinafter, the present invention will be specifically described by way of examples, but the present invention is not limited to the following examples.

EXAMPLES

Battery 1

Production of the Positive Electrode

As the positive electrode active material, $LiNi_{0.82}Co_{0.15}Al_{0.03}O_2$ having an average particle size of 10 μm was used. Here, 100 parts by weight of the positive electrode active material, 4.5 parts by weight of acetylene black as the conductive agent, and an N-methyl-2-pyrrolidone (NMP) solution of polyvinylidene fluoride (PVDF) (7208 manufactured by Kureha Corporation) as the binder were mixed to give a positive electrode material mixture slurry. The amount of PVDF added was 1.0 part by weight per 100 parts by weight of the positive electrode active material.

The obtained positive electrode material mixture slurry was applied to both faces of an iron-containing aluminum foil (aluminum alloy foil; A8021H-H18-15RK manufactured by Nippon Foil Mfg. Co., Ltd.) having a thickness of 15 μm as the positive electrode current collector, dried, and rolled to form a positive electrode plate having a thickness of 0.157 mm. The iron content in the iron-containing aluminum foil was 1.5 wt %.

The obtained positive electrode plate was cut into a piece having a width of 57 mm and a length of 564 mm to form a positive electrode. The thickness of the positive electrode active material layer was 71 μm per face of the positive electrode current collector.

The obtained positive electrode was heat-treated with a hot air at 280° C. for 20 seconds.

The tensile strength of the heat-treated positive electrode was measured as described above. As a result, the tensile strength when the elongation percentage of the positive electrode was 1% was 15 N/cm.

Production of the Negative Electrode

Scale-like artificial graphite having an average particle size of approximately 20 μm was used as the negative electrode active material. Here, 100 parts by weight of the negative electrode active material, 3 parts by weight of styrene-butadiene rubber as the binder, and 100 parts by weight of an aqueous solution containing 1 wt % of carboxymethyl cellulose were mixed to give a negative electrode material mixture slurry.

The obtained negative electrode material mixture slurry was applied to both faces of a copper foil having a thickness of 8 μm, dried, and rolled to form a negative plate having a thickness of 0.156 mm. The obtained negative plate was cut into a piece having a width 58.5 mm and a length of 750 mm to form a negative electrode. The thickness of the negative electrode active material layer was 74 μm per face of the negative electrode current collector.

The obtained negative electrode was heat-treated in a nitrogen atmosphere with a hot air at 190° C. for 10 hours.

Production of the Nonaqueous Electrolyte

A liquid nonaqueous electrolyte was used. The nonaqueous electrolyte was prepared by adding vinylene carbonate to a mixed solvent containing ethylene carbonate and dimethyl carbonate mixed in a volume ratio of 1:3 to a vinylene carbonate concentration of 5 wt % (approximately 0.6 mol/L), and dissolving $LiPF_6$ therein to a concentration of 1.0 mol/L.

Assembly of the Prismatic Battery

A prismatic battery as shown in FIG. 1 was produced.

First, one end of a positive electrode lead made of aluminum was attached to an exposed portion of the positive electrode current collector, and one end of a negative electrode lead made of nickel was attached to an exposed portion of the negative electrode current collector. Then, a laminate of the positive electrode, a separator made of polyethylene, and the negative electrode were wound, and the obtained wound product was pressed to form an electrode group whose horizontal cross-section was substantially elliptical. The obtained electrode group was accommodated in a prismatic battery case such that a lower insulating plate was disposed at the lower end.

The other end of the negative electrode lead was connected via an upper insulating plate to a rivet located at the center of a sealing plate. The other end of the positive electrode lead was connected via the upper insulating plate to the back face of the sealing plate.

Then, the peripheral edge of the sealing plate was fitted to the open end portion of the battery case. The fitted portion was sealed by laser welding. Next, 2.14 g of the nonaqueous electrolyte was injected via an injection opening. Next, charge was performed with a current of 200 mA for 30 minutes. Then, the injection opening was blocked by a sealing stopper, and sealed by laser welding. In this manner, a prismatic lithium ion secondary battery having a width of 35 mm, a thickness of 5.7 mm, a total height of 36 mm, and a battery capacity of 1000 mAh was completed. The obtained prismatic battery was taken as a battery 1.

Battery 2

A battery 2 was produced in the same manner as in the battery 1 except that the positive electrode was heat-treated with a hot air at 280° C. for 40 seconds, and the tensile strength was set to 10 N/cm.

Battery 3

A battery 3 was produced in the same manner as in the battery 1 except that the positive electrode was heat-treated with a hot air at 280° C. for 60 seconds, and the tensile strength was set to 7 N/cm.

Comparative Battery 1

A comparative battery 1 was produced in the same manner as in the battery 1 except that the positive electrode was heat-treated with a hot air at 230° C. for 60 seconds, and the tensile strength was set to 17 N/cm.

Comparative Battery 2

A comparative battery 2 was produced in the same manner as in the battery 1 except that the positive electrode was not heat-treated. The tensile strength of the positive electrode when the elongation percentage was 1% was 20 N/cm.

Comparative Battery 3

A positive electrode was produced in the same manner as in the battery 1 except that A-1085H-H18 manufactured by Showa Denko K.K. was used as the positive electrode current collector.

The positive electrode was heat-treated with a hot air at 280° C. for 20 seconds. The tensile strength of the heat-treated positive electrode was 20 N/cm.

A comparative battery 3 was produced in the same manner as in the battery 1 except that the heat-treated positive electrode was used.

Here, as described above, in Aluminum Foil 1085, the amount of iron atoms is less than 1.2 wt % of that of an aluminum foil.

Reference Battery 4

The positive electrode produced for the comparative battery 3 was heat-treated with a hot air at 280° C. for five hours. The tensile strength of the heat-treated positive electrode was 10 N/cm.

A reference battery 4 was produced in the same manner as in the battery 1 except that the heat-treated positive electrode was used.

Evaluation

Measurement of Increase in Battery Thickness before and after Finishing Process

The increases in the battery thickness of the batteries 1 to 3, the comparative batteries 1 to 3, and the reference battery 4 before and after a finishing process were measured in the following manner.

First, the thickness of the central portion of each battery immediately after the production was measured. The obtained battery thickness was taken as T1.

Next, a finishing process as below was performed. Each battery was charged under a 25° C. environment with a constant current of 200 mA until the battery voltage reached 4.1 V, and, then, the charged battery was discharged with a constant current of 200 mA until the battery voltage was reduced to 3.0 V. Next, the discharged battery was charged with a constant current of 200 mA until the battery voltage reached 4.1 V, and the charged battery was stored under a 45° C. environment for two days. Then, the stored battery was discharged under a 25° C. environment with a constant current of 200 mA until the battery voltage was reduced to 2.5 V.

Then, the thickness of the central portion of the battery was measured. The obtained battery thickness after the finishing process was taken as T2.

The increase ΔTl in the battery thickness before and after the finishing process of the battery was obtained using the equation: ΔTl=T2−T1. Table 1 shows the obtained results.

Measurement of the Standard Capacity of the Battery

The standard capacities of the batteries 1 to 3, the comparative batteries 1 to 3, and the reference battery 4 were measured in the following manner.

Each battery after the finishing process was charged under a 25° C. environment with a constant current of 200 mA until the battery voltage reached 4.2 V, and then charged with a constant voltage of 4.2 V until the current was reduced to 50 mA. Next, the charged battery was discharged with a constant current of 200 mA until the battery voltage was reduced to 2.5 V. The discharge capacity at that time was taken as a standard capacity. Table 1 shows the obtained results.

Cycle Test

The increases in the battery thickness of the batteries 1 to 3, the comparative batteries 1 to 3, and the reference battery 4 after repeated charge/discharge cycles were measured in the following manner, in comparison with those immediately after the production.

Each battery was charged under a 45° C. environment with a constant current of 1000 mA until the battery voltage reached 4.2 V, and then charged with a constant voltage of 4.2 V until the current reached 50 mA. Then, the charged battery was discharged with a constant current of 1000 mA until the battery voltage was reduced to 2.5 V. Such charge/discharge cycles were repeated. After the 500th charge/discharge cycle ended, the battery thickness T3 of the central portion was measured.

The increase $\Delta TS$ in the battery thickness after cycles was obtained using the equation: $\Delta TS = T3 - T1$. Table 1 shows the obtained results.

Furthermore, the ratio of the discharge capacity at the 500th cycle with respect to that at the first cycle was taken as a capacity retention ratio. Table 1 shows the results. In Table 1, the capacity retention ratio is indicated in percentage.

Evaluation of the Thermal Stability of the Battery

The thermal stabilities of the batteries 1 to 3, the comparative batteries 1 to 3, and the reference battery 4 were evaluated in the following manner.

Each battery that had undergone 500 cycles of charge/discharge was charged under a 25° C. environment with a constant current of 200 mA until the battery voltage reached 4.2 V, and then charged with a constant voltage of 4.2 V until the current reached 50 mA. The charged battery was heated at a heating rate of 2° C./min, and the temperature at which the battery started to generate heat was measured. Table 1 shows the obtained results.

Here, Table 1 also shows the heat treatment conditions and the tensile strength of the positive electrode included in each battery.

strength of the positive electrode is low, buckling of the electrode group is suppressed even when charge/discharge is repeated.

Furthermore, in the batteries 1 to 3, a reduction in the capacity retention ratio and lowering of the thermal stability were suppressed. In the batteries 1 to 3, as described above, buckling of the electrode group caused by repeated charge/discharge cycles was suppressed, and, thus, the electrode group was uniformly charged. It seems that, as a result, a reduction in the capacity retention ratio and lowering of the thermal stability of the battery after charge/discharge cycles were suppressed.

On the other hand, in the comparative battery 1, in which the positive electrode was not heat-treated, the comparative battery 2, in which the heat treatment temperature of the positive electrode was low, and the comparative battery 3, in which a current collector (A-1085H) that required time to be heat-treated was used, the increases $\Delta TI$ and $\Delta TS$ in the battery thickness were significantly large. Furthermore, these batteries had a large reduction in the capacity retention ratio and a large reduction in the thermal stability.

In the comparative batteries 1 to 3, the tensile strength of the positive electrode when the elongation percentage was 1% was greater than 15 N/cm. It seems that, as a result, with charge/discharge cycles, buckling of the electrode group increased, and the battery thickness increased.

Furthermore, in the comparative batteries 1 to 3, buckling of the electrode group associated with charge/discharge cycles was large, and, thus, a portion that could not be easily charged and a portion that could be easily charged were formed. It seems that, as a result, each time charge/discharge cycles were repeated, a reduction in the capacity retention ratio occurred, and the thermal stability of the battery after charge/discharge cycles was reduced.

In the reference battery 4, the standard capacity was significantly reduced. The positive electrode current collector (A-1085H) used in the reference battery 4 has to be heat-treated for a long time for softening. If heat treatment

TABLE 1

|  | Heat treatment temperature and time | Tensile strength of positive electrode (N/cm) | $\Delta TI$ (mm) | $\Delta TS$ (mm) | Standard capacity (mAh) | Heat generating temperature (° C.) | Capacity retention ratio (%) |
| --- | --- | --- | --- | --- | --- | --- | --- |
| Battery 1 | 280° C. × 20 sec | 15 | 0.08 | 0.3 | 1000 | 170 | 85 |
| Battery 2 | 280° C. × 40 sec | 10 | 0.06 | 0.2 | 995 | 170 | 85 |
| Battery 3 | 280° C. × 60 sec | 7 | 0.05 | 0.1 | 990 | 170 | 90 |
| Comp. Battery 1 | 230° C. × 60 sec | 17 | 0.15 | 0.8 | 995 | 120 | 70 |
| Comp. Battery 2 | Not heat-treated | 20 | 0.30 | 1.2 | 1000 | 120 | 50 |
| Comp. Battery 3 | 280° C. × 20 sec | 20 | 0.30 | 1.2 | 1000 | 120 | 50 |
| Ref. Battery 4 | 280° C. × 5 hour | 10 | 0.05 | 0.2 | 750 | 170 | 80 |

As can be seen from the results for the batteries 1 to 3 in Table 1, both of the increase $\Delta TI$ in the battery thickness after the finishing process and the increase $\Delta TS$ in the battery thickness after 500 cycles of charge/discharge were reduced as the tensile strength of the positive electrode was lowered. The reason for this seems to be that, if the tensile is performed for a long time, the binder (PVDF) contained in the positive electrode is melted, and the melted binder covers the surface of the active material. It seems that, as a result, the standard capacity of the reference battery 4 was significantly reduced.

INDUSTRIAL APPLICABILITY

The nonaqueous electrolyte secondary battery of the present invention has excellent cycle characteristics, and excellent thermal stability and excellent dimensional stability after repeated charge/discharge cycles. Thus, the nonaqueous electrolyte secondary battery of the present invention can be preferably used, for example, as a power source of consumer apparatuses, electric vehicles, and large tools.

The invention claimed is:

1. A nonaqueous electrolyte secondary battery, comprising:
 a wound-type electrode group including a positive electrode having a length greater than a width, a negative electrode having a length greater than a width, and a separator disposed between the positive electrode and the negative electrode;
 a nonaqueous electrolyte; and
 a prismatic battery case accommodating the electrode group and the nonaqueous electrolyte, wherein:
 a horizontal cross-section of the electrode group has a major axis and a minor axis, and is elliptical or substantially elliptical,
 the positive electrode includes a positive electrode current collector and a positive electrode active material layer disposed on the positive electrode current collector,
 the negative electrode includes a negative electrode current collector and a negative electrode active material layer disposed on the negative electrode current collector,
 a tensile strength of the positive electrode, when an elongation percentage in a longitudinal direction of the positive electrode is 1%, is not greater than 10 N/cm at a room temperature,
 the positive electrode current collector is mainly composed of aluminum, the positive electrode current collector contains iron atoms, and the iron atoms are contained in an amount of 1.2 wt % to 1.7 wt % of the positive electrode current collector, and
 a tensile strength of the negative electrode, when an elongation percentage in a longitudinal direction of the negative electrode is 1%, is in a range of 7 to 15 N/cm at a room temperature.

2. The nonaqueous electrolyte secondary battery in accordance with claim 1, wherein the negative electrode active material layer includes a negative electrode active material, and the negative electrode active material includes a silicon-containing material.

3. The nonaqueous electrolyte secondary battery in accordance with claim 1, wherein the tensile strength of the positive electrode is controlled by heat-treating the positive electrode.

* * * * *